United States Patent [19]

Ohara et al.

[11] Patent Number: 4,830,101

[45] Date of Patent: May 16, 1989

[54] ALUMINUM HEAT EXCHANGER AND METHOD FOR PRODUCING ALUMINUM HEAT EXCHANGER

[75] Inventors: Toshio Ohara, Kariya; Toshio Takahashi, Oubu; Masayoshi Nishikawa, Kariya; Tutomu Niwa, Chiryu; Takao Ogino, Yokohama; Ryosuke Sako, Ichikawa; Hideaki Kaneko, Tokyo, all of Japan

[73] Assignees: Nippondenso Co., Ltd., Kariya; Nihon Parkerizing Co., Ltd., Tokyo, both of Japan

[21] Appl. No.: 857,068

[22] Filed: Apr. 29, 1986

[30] Foreign Application Priority Data

Apr. 30, 1985 [JP] Japan .................... 60-92932

[51] Int. Cl.$^4$ .................... F28F 13/18; F28F 19/02
[52] U.S. Cl. .................... 165/133; 165/134.1; 427/409
[58] Field of Search .................... 165/133, 134.1, 913; 62/287; 427/409, 419.1, 419.2, 387, 388.1, 376.1

[56] References Cited

U.S. PATENT DOCUMENTS

| | | | |
|---|---|---|---|
| 4,353,224 | 10/1982 | Nonogaki | 62/515 |
| 4,368,776 | 1/1983 | Negita et al. | 165/133 |
| 4,421,789 | 12/1983 | Kaneko et al. | 427/204 |
| 4,536,420 | 8/1985 | Rickert, Jr. | 427/257 |
| 4,588,025 | 5/1986 | Imai et al. | 165/133 |
| 4,726,886 | 2/1988 | Kaneko et al. | 165/148 X |

FOREIGN PATENT DOCUMENTS

| | | |
|---|---|---|
| 335235 | 2/1977 | Austria . |
| 335249 | 2/1977 | Austria . |
| 346989 | 4/1978 | Austria . |
| 2515007 | 10/1976 | Fed. Rep. of Germany . |
| 55-99976 | 7/1980 | Japan . |
| 58-16192 | 1/1983 | Japan . |
| 59-202398 | 11/1984 | Japan . |

OTHER PUBLICATIONS

H. Kittel "Lehrbuch der Lacke und Beschichitungen", Band III, 1976 Verlag W. A. Colomb in der H. Heenemann GmbH, Berlin-Oberschwandorf pp. 280–289, 329–335, 396–398.

H. Kittel "Lehrbuch der Lacke und Beschichtungen", Band II, 1974 Beschichtungen, Band II, 1974, Verlag W. A. Colomb in der H. Heenemann GmbH, Berlin-Oberschwandorf—pp. 316–323, European Sch. Rpt.

*Primary Examiner*—Ira S. Lazarus
*Assistant Examiner*—Richard R. Cole
*Attorney, Agent, or Firm*—Cushman, Darby & Cushman

[57] ABSTRACT

A heat exchanger has special usage such as an evaporator of an automotive air conditioner. This heat exchanger can improve wettability and can reduce a scattering of condensed water. This heat exchanger is treated by a special chemical conversion treatment so that this heat exchanger has two layers of coating on the surface thereof. One of the two layers is a chemical conversion coating formed on the surface of the heat exchanger. The other one is a resin coating formed over the chemical conversion coating. The chemical conversion coating is treated by immersing the heat exchanger into a water solution. The resin coating is also treated by immersing the heat exchanger having the chemical conversion coating into a water solution of organic high polymer material.

18 Claims, 2 Drawing Sheets

ALUMINUM HEAT EXCHANGER AND METHOD FOR PRODUCING ALUMINUM HEAT EXCHANGER

BACKGROUND OF THE INVENTION

This invention relates to a heat exchanger made of aluminum, (the word aluminum in this specification means aluminum as well as aluminum alloy) and a method for making the aluminum heat exchanger. The heat exchanger as this invention has a preferred usage of an evaporator for a refrigerant circuit, such as the evaporator of an automotive air conditioner.

Conventionally, such an evaporator has the problem that moisture is condensed on the surface thereof and drops off. Such droplets hinders the air flow passing through the evaporator. The droplets held in the evaporator reduces its heat exchanging efficiency, and also the droplets cause the problem that they are scattered downstream with the air flow.

Also the droplets held between fins of the evaporator causes rust on the fins.

Recently, such aluminum heat exchangers have been treated with a surface treatment in order to obtain an effective resistance to corrosion and impart a hydrophilic property. One embodiment of this surface treatment is explained hereinafter. Chemical conversion treatment, such as chromating, phosphating, which improves resistance to corrosion, is so applied that the aluminum base material 7 (shown in FIG. 5) which is used as the fin is covered with the chemical conversion coating 12. After the chemical conversion coating 12 is applied, inorganic material, such as silica particulates or silicate, which provides an effective hydrophilic property is so coated over the coating 12 that a coating 13 of inorganic material is made.

However, the inorganic material is easy to be removed after the fin has been used for a while, so that the organic material has a tendency to be scattered as particulates. The hydrophilic efficiency and the resistance to corrosion is, therefore, reduced. Furthermore, the particulates of the inorganic material stimulates operators' noses and makes them feel uncomfortable.

The aluminum heat exchanger has its fins covered by an Al—Si type brazing material containing a lot of silicon in order to braze the tube and the fins. Therefore, an eutectic crystal 11 (shown in FIG. 5) made from aluminum and silicon remains on the surface of the aluminum base material of the fin after brazing. Since the chemical conversion coating 12 is difficult to be deposited on the eutectic crystal 11, the problems described above become more serious.

The present invention has the object of solving such problems. The object of this invention is to reduce the scattering of the particulates even after the heat exchanger is used for a long while. A further object of this invention is to provide an aluminum heat exchanger which has an effective hydrophilic property (wettability) and a resistance to corrosion. A still further object of this invention is to provide a preferred method for producing the aluminum heat exchanger.

SUMMARY OF THE INVENTION

To attain the above objects, the present invention employs tubes and fins made of aluminum, a chemical conversion coating on the surface of the aluminum base material of which the tubes and the fins are made, and a resin coating, made of organic high polymer which has a tendency of being cationic in a water solution, over the chemical conversion coating.

The method producing the above aluminum heat exchanger comprises the steps of:

a first step of assembling the tubes and fins, a second step of immersing the heat exchanger in a water solution of a treatment material for the chemical conversion coating so that the chemical conversion coating is applied on the surface of the aluminum base material, a third step of immersing the heat exchanger having the chemical conversion coating in a water solution of cation organic high polymer material, so that a resin coating of the organic high polymer is applied over the chemical conversion coating.

The chemical conversion treatment employed in this invention is the alkaline-chromate method, chromate method, chromium phosphate method or zinc phosphate method, which are typical surface treatment methods for aluminum, titanium or zirconium phosphate coating treatment which is used as chromium free conversion method or chromic acid containing resin coating treatment method.

The aluminum heat exchanger of this invention can be used in various usages. An automotive heat exchanger is required to be small, light and have high heat exchanging efficiency, and also the environment in which such a heat exchanger is used may be very severe.

Therefore, an automotive heat exchanger requires a coating having high resistance to corrosion and which can be applied to a complex shaped heat exchanger. The chemical conversion method for the coating involving chromie acid is most preferable in order to attain the above requirements.

After the chemical conversion coating is formed on the aluminum heat exchanger, the heat exchanger is immersed in the organic high polymer solution which is cationic in the water solution for applying the high polymer resin coating.

The organic high polymer resin which is cationic in a water solution which can be used for this invention is mainly high polymer resin having a lot of amino group (—$NR_2$:R means H, OH or Alkyl) in the molecule.

The resin having —$NR_2$ in its structure becomes cationic —$NHR_2^+$ with inorganic acid or organic acid, in a water solution, so that the resin can be dissolved or dispersed in the water solution.

The resin being cationic and dissolved or dispersed in the water solution then loses its charge when the resin is immersed in an alkaline solution or a solution involving anion components, so that the resin precipitates or deposits. With existence of polyvalent metal ions, the resin coagulates. Organic high polymer resin coating which is cationic in a water solution is applied on the chemical conversion coating consisting of polyvalent metal ions, such as zinc, chromium or aluminum, and anion, such as phosphate ions or chromate ions. When the base metal material or the chemical conversion coating is dissolved under a corrosive atmosphere, such polyvalent metal ions or anion ions are so combined with the resin that the resin becomes hard to disperse.

Such resin coating has wettability. Corboxyl, hydroxide or amino groups may be introduced in the structure of the in order to improve wettability. Water soluble polyamide resins, polyethylene imins, cationic high polymer surface activating agents and resins which are used for cathodic electrodeposition paints are used as the resin of this invention. Especially, the water soluble polyamide resin is preferred.

The corrosion resistance of the high polymer resin film which is formed over the aluminum base material surface, which has already been treated by a chemical conversion treatment, in accordance with this invention is more effective than that of the film of a single resin. The resin solution of this invention is prepared by adding salt of a tetravalent metal, such as silicon, zirconium, titanium or tin, into the solution of the organic high polymer resin which is cationic in a water solution, and adjusting the pH of the solution within the range of 2-7 by means of an inorganic acid or an organic acid.

Phosphate acid is the most effective within a plurality of inorganic acids which can be used in this invention. A variety of monobasic acids, dibasic acids or polybasic acids can be used as the organic acid.

The temperature of the solution of this invention is controlled between room temperature and 80° C. The temperature is normally controlled under room temperature (10°-40° C.), but the temperature may be increased in order to promote workability. The temperature, however, should be controlled under 80° C. in order to prevent the evaporation of the water and a change of the concentration of the solution.

A resin coating involving cation charged colloidal silica which can disperse uniformly within the cationic high polymer resin solution of this invention can improve the resistance to corrosion and the wettability.

Bacteria has a tendency to grow in the heat exchanger because of the high humidity and condensed water, and a number of dust particles in the air are also easy to be deposited on the heat exchanger because of its complex shape, so that the bacteria and the dust particles may generate bad odors. Therefore, a bactericide is preferred to be involved in the organic high polymer resin coating which is cationic within a water solution in order to prevent growth of bacteria on the surface of the heat exchanger with high humidity. A deodorant or an aromatic agent may be added to the organic high polymer resin coating in order to remove the bad odors.

EMBODIMENTS

The preferred embodiment of this invention is explained hereinafter.

Figure 1:
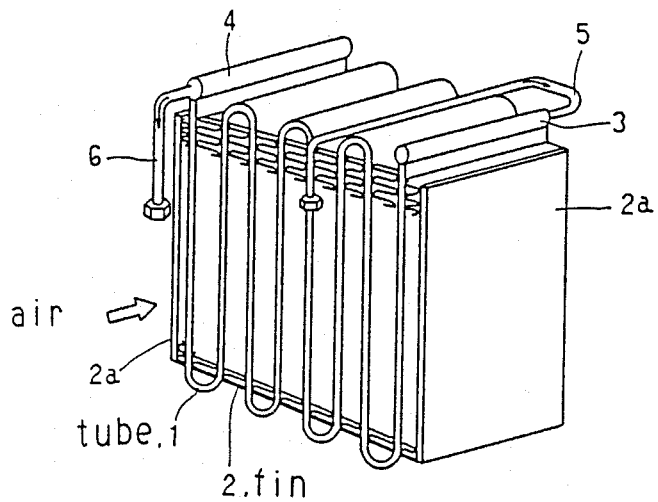
FIG. 1 is a perspective view of an evaporator for an automotive air conditioner to which the present invention is applied.

FIG. 1 shows one embodiment of a heat exchanger to which this invention is applicable, and which is used as an evaporator of an automotive air conditioner. Numeral 1 shows a flat tube formed by extrusion and bent to be serpentine. The tube 1 is made of aluminum such as A1050, A3003, or alloys adding a little of Cu, Mn or Fe into A1050 or A3003.

Numeral 2 shows corrugated fins made of aluminum, such as A1050, A3003 or alloys adding a little of Sn, Zn or In into A1050 or A3003, and located on the straight portions of the tube.

Brazing material such as A4004 or A4343 is clad on both sides of the fins 2 in order to braze between the tube 1 and the fin 2. Brazing material should cover the outer surface of the tube 1 when the material of the fin 2 has no brazing material thereon. Numeral 2a shows end plates connected with the fins 2 at the opposite ends of the evaporator.

Numeral 3 shows a distributing pipe for distributing coolant into the tube 1, so that the distributing pipe 3 is connected at an inlet portion of the tube 1. Numeral 4 shows a gathering pipe for gathering the coolant from the tube 1, so that the gathering pipe 4 is connected to an outlet portion of the tube 1. Numeral 5 shows an inlet pipe for introducing the coolant into the distributing pipe 3. Numeral 6 shows an outlet pipe through which flows the coolant from the gathering pipe 4. These elements 2, 3, 4, 5 and 6 are made of aluminum.

Figure 2:
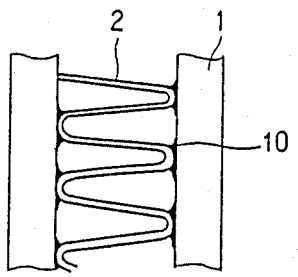
FIG. 2 is an enlarged front view of a part of the evaporator shown in FIG. 1.

After assembly of its parts the aluminum heat exchanger shown in FIG. 1, is then carried into a furnace, the atmosphere in which is a vacuum or an inert gas, and is brazed therein. FIG. 2 shows a part of the heat exchanger after brazing. Numeral 10 shows a filet.

The outer surface of the heat exchanger after brazing is then cleaned through a cleaning stage, such as water rinsing.

After that, a surface treatment is applied to the outer surface of the heat exchanger in order to apply both a chemical conversion coating and, resin coating. The surface treatment is explained hereinafter.

EXAMPLE 1

Chromic chromate conversion material for aluminum (BONDERITE ® 713, produced by NIHON PARKERIZING Co. Ltd.,) was diluted in water to a concentration of 72 g/l. The cleaned heat exchanger was immersed to the water solution about two minutes in order to apply a chromic chromate conversion coating thereon. The deposited amount of the chromium was about 100 mg/m$^2$. The heat exchanger, then was water rinsed.

Water soluble polyamide resin (trade name AQ NYLON produced by TORAY INDUSTRIES, INC.) which is cationic in a water solution was dissolved in water, the ratio being 20 g/l, and the pH was adjusted to 3 with phosphoric acid.

After immersing the heat exchanger in the above resin solution, the temperature of which was about 30° C., the resin coating was then baked for about 30 minutes under a temperature of 120° C. so that a polyamide resin coating was formed over the chromate chemical conversion coating, the weight of the polyamide resin coating being about 0.5 g/m$^2$.

Figure 3:
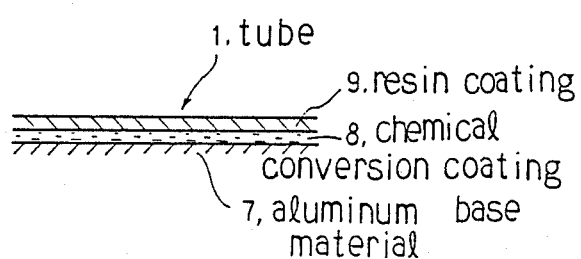
FIG. 3 is an enlarged sectional view of a part of a tube 1 shown in FIG. 2.

FIG. 3 shows the chromic chromate chemical conversion coating 8 and the water soluble polyamide resin coating 9 over the tube 1 which is not clad with the brazing material.

Figure 4:
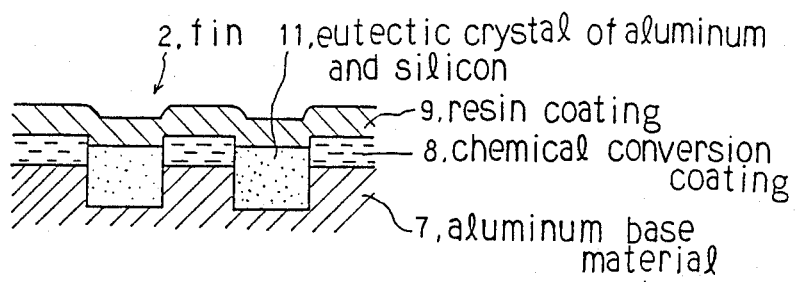
FIG. 4 is an enlarged sectional view of a part of a fin 2 shown in FIG. 2.
Figure 5:
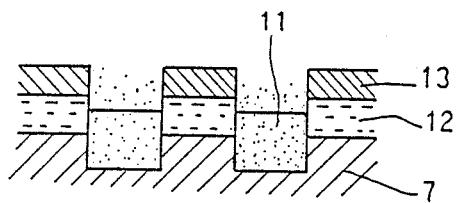
FIG. 5 is an enlarged sectional view of a part of a fin produced by a conventional process.

FIG. 4 shows the chromic chromate conversion coating and the water soluble polyamide resin coating 9 over the fin 2 which is clad with the brazing material. Numeral 7 in FIG. 4 shows aluminum base material and numeral 11 shows eutectic crystal of aluminum and silicon in the brazing material.

The corrosion resistance of the aluminum heat exchanger treated by the above treatment was examined by the salt spray test according to JIS Z-2371. The time for development of 5% of white rust was about 200 hours. The hydrophilic property was evaluated by measuring the contact angle of the water with a goniometer. The contact angle was about 10 degrees, which showed a good result, and the contact angle of the water was not increased even after 1 month's aging.

The contact angle of the water also was not increased even after the heat exchanger of this invention was immersed in running water. Therefore, the heat exchanger of this invention can maintain good wettability for a long period of time without deterioration. Furthermore, the aluminum heat exchanger after running water immersion was used effectively as an evaporator for an automotive air conditioning system. The evaporator did not scatter the condensed water and also did not generate bad odors. The results of test 1 are shown in Table 1 at the end of this specification.

COMPARATIVE EXAMPLE 1

This example has a single layer of chromate conversion coating applied by the same process as the above example 1 and no resin coating. This comparative example 1 had a slightly better resistance to corrosion than that of example 1. After aging, however, the contact angle of the water, increased so that the wettability of this comparative example 1 was reduced.

When the comparative example 1 was used as the evaporator for an automotive air conditioning system after running water immersion which was the same as that for example 1, the condensed water on the evaporator scattered and dropped off.

EXAMPLE 2

The cleaned heat exchanger was immersed in a solution for chromiun phosphate conversion for aluminum (BONDERITE ® 701 AB 48 g/l and BONDERITE ® 701 AC 27 g/l produced by NIHON PARKERIZING Co., Ltd.). The temperature was about 50° C. and the immersion time was about 1 minute, so that a chromium phosphate coating was formed, the weight of which was about 150 mg/m$^2$ as chromium. Then the heat exchanger was water rinsed.

After that the heat exchanger was coated by immersion in a water solution, the pH of which was 6.5, the temperature of which was 35° C. and which contained 20% of quaternary compound of the copolymer of vinylpyrrolidone and dimethyl amino ethyl methacrylate (Cationic acrylic resin, trade name COPOLYMER 937 produced by GAF corp.). Then the resin coating was baked in a hot air oven for about 30 minutes at 120° C., so that the resin coating, the weight of which was about 0.5 g/m$^2$, was formed over the chromium phosphate conversion coating.

The test results of the aluminum heat exchanger of this example, tested in the same manner as in example 1, is shown in the Table 1.

COMPARATIVE EXAMPLE 2

A single layer of chromium phosphate conversion coating, which was formed by the same process as that of example 2 with no resin coating, had an increase in its water contact angle after aging, as shown in Table 1. Thus, the wettability of comparative example 2 was reduced and inferior to that of example 2.

When the coated heat exchanger of this comparative example 2 was used as the evaporator of an automotive air conditioner, it generated bad odors and the condensed water scattered from the evaporator, the same as that of comparative example 1.

EXAMPLE 3

After forming a chromic chromate conversion coating by the same process as that of example 1. the heat exchanger was water rinsed. The heat exchanger was then immersion in a water soluble polyamide resin solution the pH of which was adjusted to 3 with phosphoric acid, the temperature of which was 30° C. and which contained hydrofluo zireonic complex at a concentration of 6 g/l. After that, the exchanger was baked in a hot air oven for about 30 minutes at 120° C., to form a resin coating the weight of which was about 0.3 g/m$^2$.

The test results of the aluminum heat exchanger produced by this process, and tested in the same manner described above, are shown in Table 1.

As shown in Table 1, the resistance to corrosion of this example 3 was better than that of example 1.

EXAMPLES 4-6

After forming a chromic chromate conversion coating on the surface of the heat exchangers by the same process as that in example 1, the heat exchangers were water rinsed. The heat exchangers were then immersed respectively in 3 types of water soluble polyamide resin solutions of 20 g/l concentration, a first of which contained cation charged dispersive colloidal silica (SNOWTEX ® AK, by NISSAN KAGAKU) of 2 g/l concentration, a second of which contained the same cation charged dispersive colloidal silica at a concentration of 5 g/l, and the third of which contained the same cation charged dispersive colloidal silica at a concentration of 10 g/l. After immersing the heat exchangers respectively in these 3 types of solutions, the heat exchangers then baked in a hot air oven for about 30 minutes at 120° C., to form high polymer resin coatings including colloidal silica the weights of which were about 0.3, about 0.4 and about 0.5 g/m$^2$, respectively.

The test results of the aluminum heat exchangers producted by these processes are shown in Table 1.

COMPARATIVE EXAMPLES 3-5

Heat exchangers having chromic chromate conversion coatings formed by the same process as in example 1 were respectively immersed in three types of anionic dispersive acrylic resin emulsion (TOCRYL ® N-142 produced by TOYO INK Mfg.) solutions, the resin solid contents of which were 20 g/l, and each of which contained anion charged dispersive colloidal silica (SNOWTEX ® 0 produced by NISSAN KAGAKU). A first solution contained 5 g/l, of the silica. A second solution contained 10 g/l and a third solution contained 20 g/l of the silica. After immersion the heat exchangers were baked in a hot air oven for about 30 minutes at 120° C. to form high polymer resin coatings including colloidal silica the weights of which was about 0.4, about 0.5 and about 0.6 g/m$^2$ respectively.

The test results of the aluminum heat exchangers of these examples are shown in Table 1. As shown in Table 1, the ratio of colloidal silica and resin is required to be high in order to improve wettability. The higher amounts of colloidal silica, however, may increase the uncomfortableness of the operator.

EXAMPLE 7

After forming a chromium phosphate conversion coating on the surface of the heat exchanger by the same process as in example 2, the heat exchanger was water rinsed. The heat exchanger was then immersed in a solution of water soluble high polyamide resin the same as in example 1. In that solution was dissolved hydrofluo zirconic complex at a concetration of 10 g/l. The pH of the solution was adjusted to 3.5 with oxalic acid and bactericide and deodorant were added. After immersing in the solution, the heat exchanger was baked in a hot air oven for about 3-5 minutes at 120° C. to form an organic high polymer coating the weight of which was about 0.4 g/m².

The test results of an the heat exchanger of this example are shown in Table 1.

Even after 6 months of use as the evaporator of automotive air conditioner, the heat exchanger did not generate any bad odor, namely the heat exchanger of this example shows a preferred result compared with example 2.

The heat exchanger produced by the process shown in example 2 generates a bad rotten odor after 6 months of use as the evaporator of an automotive air conditioner.

Though, the heat exchanger shown in FIGS. 1 and 2 is assembled of a flat tube 1 and corrugate fins 2, the present invention can be used with heat exchangers other than that shown FIGS. 1 and 2. The present invention can be used for a heat exchanger which has a tube and plate fins, which is comprised of a plurality of tubes and a plurality of plates and corrugated fins, or other types of the heat exchangers which have fins made integrally with flat tubes. As described above, the present invention can maintain a good hydrophilic property and a high resistance to corrosion for a long time, and the heat exchanger of this invention will not generate bad odors.

What is claimed is:

1. Aluminum heat exchanger comprising:
   a tube made of aluminum,
   a plurality of fins made of aluminum,
   a chemical conversion coating formed on a surface of the aluminum base material which forms at least one of said tube and said fin, and
   a resin coating of an organic high polymer, which reacts with said chemical conversion coating, include silica of an amount less than 10 g/l and is cationic in a water solution, formed over said chemical conversion coating.

2. Aluminum heat exchanger as claimed in claim 1, wherein;
   said resin coating is of a polyamide resin.

3. Aluminum heat exchanger as claimed in claim 2, wherein;
   said chemical conversion coating is of chromium phosphate.

4. Aluminum heat exchanger as claimed in claim 2, wherein;
   said chemical conversion coating is of chromic chromate.

5. Aluminum heat exchanger as claimed in claim 1, wherein;
   said resin coating is of cationic acrylic resin.

6. Aluminum heat exchanger as claimed in claim 5, wherein;
   said chemical conversion coating is of chromium phosphate.

7. Aluminum heat exchanger as claimed in claim 5, wherein;
   said chemical conversion coating is ofchromic chromate.

8. Aluminum heat exchanger as claimed in claim 1, wherein;

TABLE 1

| | chemical conversion coating | resin coating | corrosion resistance | contact angle of water | | | uncomfortable condition bad smell etc. generated while using |
| --- | --- | --- | --- | --- | --- | --- | --- |
| | | | | early stage | laying in room | water flow immersion | |
| example 1 | chromic chromate | water soluble phlyamide resin | 200 hours | less than 10° | less than 10° | less than 10° | rare |
| Comparative example 1 | chromic chromate | — | 240 hours | 10-20° | 70-80° | 50-70° | slight |
| example 2 | chomium phosphate | catiomic acrylic resin | 96 hours | less than 10° | less than 10° | less than 10° | rare |
| Comparative example 2 | chomium phosphate | — | 120 hours | 10° | 40-50° | 30-50° | much |
| example 3 | chromic chromate | water soluble phlyamide, gireonic complex | 240 hours | less than 10° | less than 10° | less than 10° | rare |
| example 4 | chromic chromate | water soluble phlyamide, silica 2 g/l | 240 hours | less than 10° | less than 10° | less than 10° | ↑ |
| example 5 | " | water soluble phlyamide, silica 5 g/l | 240 hours | less than 10° | less than 10° | less than 10° | ↑ |
| example 6 | " | water soluble phlyamide, silica 10 g/l | 240 hours | less than 10° | less than 10° | less than 10° | slight |
| Comparative example 3 | " | acrylic resin.silica 5 g/l | 240 hours | 60° | 60° | 60° | rare |
| Comparative example 4 | " | acrylic resin.silica 10 g/l | 240 hours | 50-60° | 50-60° | 50-60° | slight |
| Comparative example 5 | " | acrylic resin.silica 20 g/l | 240 hours | 30-40° | 30-40° | 30-40° | much |
| example 7 | chomium phosphate | water soluble polyamide . titanium complex bacteride.deodorant | 120 hours | less than 10° | less than 10° | less than 10° | rare | in TABLE 1
corrosion resistance: required hours for occurring 5% of white rust when treated by the salt spray test according to JIS-2371
contact angle of water: measured by goniometer gauge
early stage: result measured within 6 hours after coating treatment
laying in room: contact angle measured after 1 month (30 days) laying in room
water flow immersion: contact angle measured in dry condition after 1 month immersing in water flow said resin coating contains a tetra valent metallic element compound.

9. Aluminum heat exchanger as claimed in claim 8, wherein;
said chemical conversion coating is of chromium phosphate.

10. Aluminum heat exchanger as claimed in claim 8, wherein;
said chemical conversion coating is of chromic chromate.

11. Aluminum heat exchanger as claimed in claim 1, wherein;
said resin coating contains a colloidal silica.

12. Aluminum heat exchanger as claimed in claim 11, wherein;
said chemical conversion coating is of chromium phosphate.

13. Aluminum heat exchanger as claimed in claim 11, wherein;
said chemical conversion coating is of chromic chromate.

14. Aluminum heat exchanger as claimed in claim 1, wherein;
said resin coating contains a bactericide and a deodorant.

15. Aluminum heat exchanger as claimed in claim 14, wherein;
said chemical conversion coating is of chromium phosphate.

16. Aluminum heat exchanger as claimed in claim 14, wherein;
said chemical conversion coating is of chromic chromate.

17. Aluminum heat exchanger as claimed in claim 1, wherein;
said chemical conversion coating is of chromium phosphate.

18. Aluminum heat exchanger as claimed in claim 1, wherein;
said chemical conversion coating is of chromic chromate.

* * * * *